Nov. 3, 1931.  E. C. RANEY  1,829,944
THERMOSTATIC SWITCH
Filed April 1, 1926   2 Sheets-Sheet 1

Inventor
Eskel C. Raney
By Faust F. Crampton
Attorney

Nov. 3, 1931.  E. C. RANEY  1,829,944

THERMOSTATIC SWITCH

Filed April 1, 1926    2 Sheets-Sheet 2

Inventor
Estel C. Raney
By Faust F. Crampton
Attorney

Patented Nov. 3, 1931

1,829,944

UNITED STATES PATENT OFFICE

ESTEL C. RANEY, OF COLUMBUS, OHIO

THERMOSTATIC SWITCH

Application filed April 1, 1926. Serial No. 99,010.

In constructions containing my invention, a thermostatic element is securely anchored at one point while the electric switch is supported so as to most effectively respond to the movements produced by reason of the change in the temperature of the thermostatic part. Also the thermostatic part is so constructed as to cause the movable point at which the switch is mounted to perform rotative or angular movements and the switch is so constructed as to perform its operations by the same rotative or angular movements. The thermostatic switch is without bearing parts that rotate relative to each other and thus retardation due to friction and the injurious results that may be produced by condensation of moisture, by the collection of dust, by corrosion or rust, or by freezing are eliminated. Consequently thermostatic switches may be used for opening and closing circuits in exact response to changes in its thermic condition in connection with a great variety of uses such as for opening circuits where the atmosphere is laden with moisture, or where the temperature approximates or is below freezing point, or in connection with more or less corrosive gases, except where such gases may affect the metal of the thermostat without affecting the responsiveness of the switch.

The invention also provides means for adjusting the thermostatic switch to cause it to respond to the desired temperatures and also means for varying the responsiveness or lag, of the operations of the switch relative to the thermic conditions of the device or apparatus whose temperature it may be desired to control through the operations of devices in the circuit or for varying the responsiveness of the device that is to be operated according to the change of the temperature of the thing with which the thermostatic switch is associated.

The invention may be contained in thermostatic switches which vary in the form of their details and to illustrate a practical application of the invention I have selected a form of thermostatic switch containing the invention as an example of such structures and shall describe it hereinafter. The thermostatic switch selected as an example is shown in the accompanying drawings.

Figure 1:
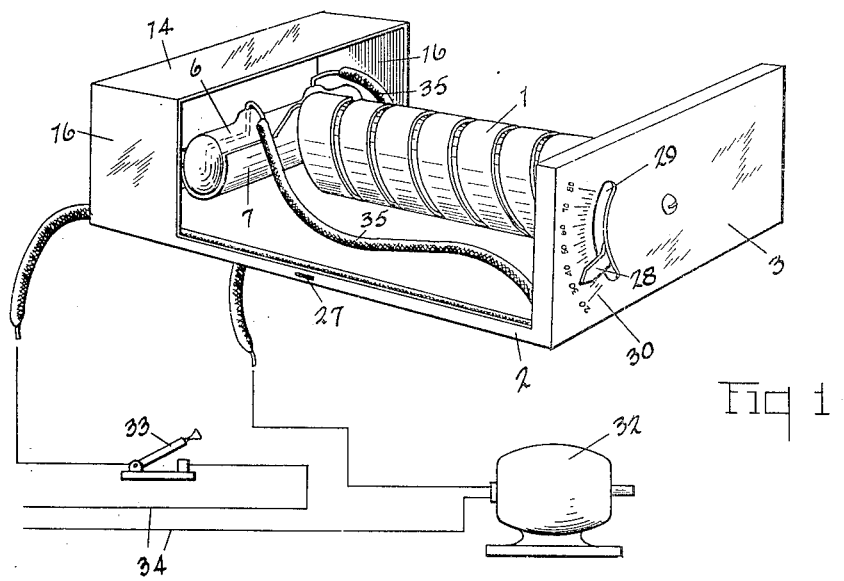
Figure 2:
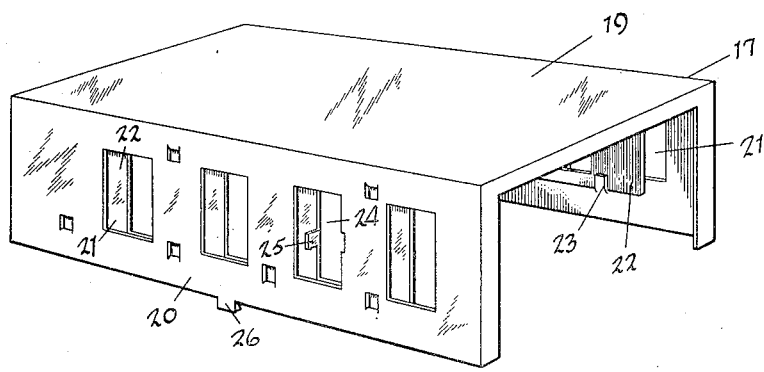
Figure 3:
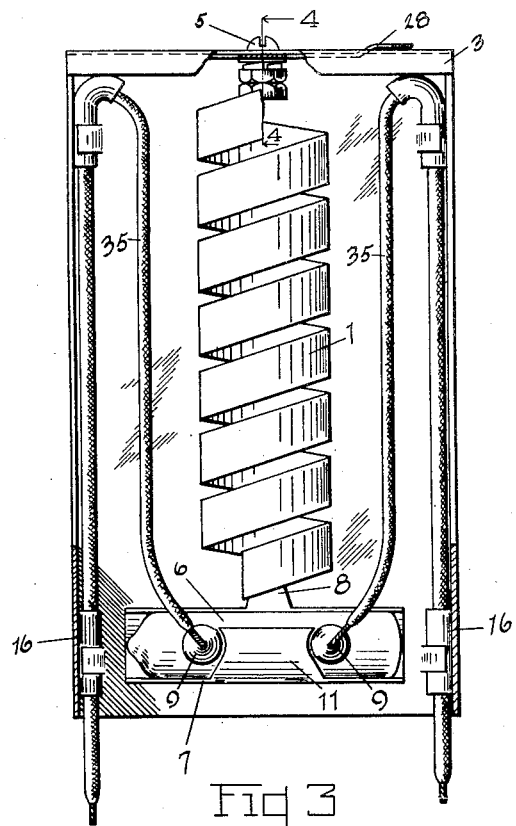
Figure 4:
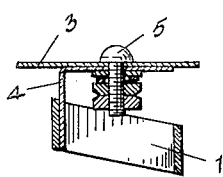
Figure 5:
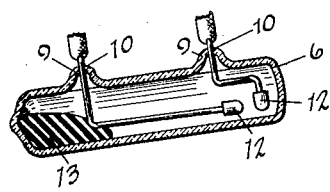
Figure 6:
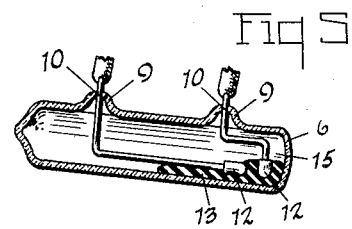
Figure 8:
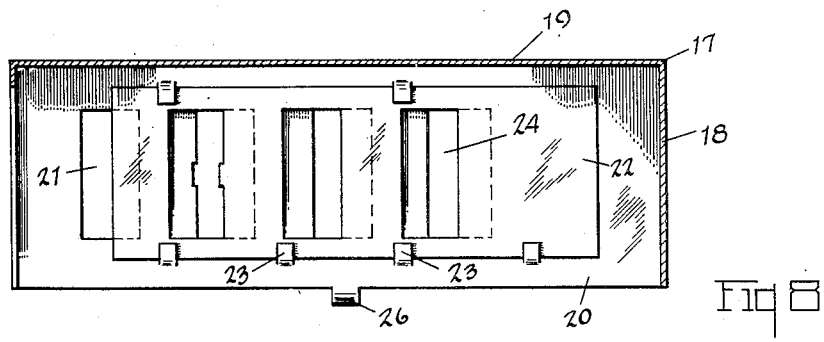
Figure 7:
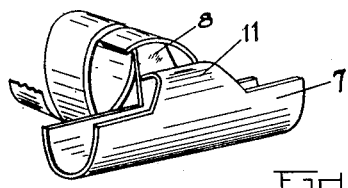

Figure 1 of the darwings illustrate a perspective view of the thermostatic switch selected as an illustration of the embodiments of my invention. Fig. 2 illustrates a perspective view of a cover that may be used for enclosing the switch shown in Fig. 1. Fig. 3 is a top view of the switch shown in Fig. 1, a part of the support for the switch being shown in section, and a part being broken away to illustrate the details of construction of the switch. Fig. 4 is a view of a section taken on the plane of the line 4—4 indicated in Fig. 3. Fig. 5 illustrates a longitudinal section of the switch part when in open position. Fig. 6 illustrates a similar section to that shown in Fig. 5, the switch, however, being showed closed. Fig. 7 is a view of a cradle for supporting the switch part. Fig. 8 illustrates a view of a section of the cover showing a shutter for adjustably controlling the retardation of the switch relative to the temperature of the atmosphere exterior to the shell.

The thermostatic switch shown in the drawings is preferably enclosed within a shell that comprises a base and a cover, the base being provided with end walls and the cover being provided with side walls that encase or surround the thermostatic switch. The thermostatic part 1 is formed of two strips of metal having different co-efficients of expansion and welded or soldered or otherwise secured together. The bimetal strip is bent in the form of a helix, preferably of small radius. One end of the spiral is anchored to the base 2 so as to locate the axis of the helical strip substantially in a horizontal plane. It is secured, preferably, to the end wall 3 of the base by means of a bracket 4 and a bolt 5. The bimetal spiral or helix is connected to the bracket 4 by soldering or otherwise and the coil extends substantially the length of the base 2, the switch part of the device being supported on the opposite end of the coiled bimetal ribbon. The bimetal strip being helical in form and having a small radius, all its parts are exposed to the atmosphere in which it is located, and the somewhat sharp uniform curvature causes marked rotative movements of its free end about the axis of the helix.

A mercury switch having its contacts sealed within a glass capsule 6 is supported in a cradle 7 which is mounted on the free end of the coiled ribbon. The cradle 7 has an ear 8 that may be connected to the end of the coil by soldering or otherwise. The cradle is formed of sheet metal and extends around the capsule 6 when it is located in the cradle, the metal of the cradle being so bent as to elastically secure to capsule in position. The glass capsules are formed by hand and consequently they are irregular in form. The cradles, however, securely hold the capsules in any position in which they may be located with respect to the bimetal strips and consequently irregularity of operations of the switches themselves that would occur by reason of irregularity of form, is easily corrected by the readily adjustable relation between the capsules and the cradles. The cradle is preferably longer than the capsule in order to protect the ends as against breakage owing to the fact that the end of the helix on which the switch part is mounted is free to move laterally except only for the elasticity of the coiled bimetal ribbon. The capsule 6, in the form of construction shown, has a pair of nipples 9 that are produced at the point of entrance and sealing of the ends of the wires 10 within the capsule and the cradle 7 is provided with a flange part 11 that extends between the nipples 9 and operates to hold the capsule 6 in position as against rotation and as against longitudinal movement relative to the cradle.

The ends of the wires 10 are provided with the contacts 12. The circuit is completed between the terminals or contacts 12 by means of the globule of mercury 13 which moves to one end or the other of the capsule as the axis of the capsule passes through a horizontal plane. The electrodes 12 are preferably located at one end of the capsule whereby the circuit of the switch is opened when the capsule is turned and the contacts are raised above a certain point and the circuit is closed when the contacts are lowered below the said point. The capsule is filled with an inert gas and is sealed against the admission of air which prevents any deleterious effect of exterior gases or moisture upon the switch contacts. The mercury switch 15 thus formed and mounted on the freely moving thermic responsive end of the thermostat accurately responds to the changes in the temperature of the bimetal thermostatic coil 1.

In order to protect the mercury switch, the base may be provided with a shelter formed by the side walls 16 and a top wall 14 that extend a short distance from the end of the base 2. The cover 17 is provided with the end wall 18, and the side walls 20 which, with the end wall 3, produce a complete enclosure of the thermostatic switch. The side walls 20 may be provided with openings 21 and damper members 22 may be supported in the lugs 23 that are struck up from the side walls 20 and by which the damper members 22 may be guided. The damper members 22 are also provided with openings 24, the openings 21 and 24 being so positioned that the effective area of the opening through the side wall 20 may be varied and consequently the respectiveness of the thermostatic switch to the temperature changes occurring exterior to the shell may be varied. The damper members are provided with lugs 25 that project exteriorly whereby the damper members may be conveniently operated to adjust the area of the openings and consequently vary the rate of change of the temperature within the shell relative to the temperature exterior of the shell. The side walls 20 may also be provided with elastic lugs 26 that engage in slots 27 whereby the cover may be secured to the base.

Means is also provided for varying the angular location of the mercury switch relative to the horizontal plane and the position of the bimetal ribbon 1 so as to cause the mercury of the switch to complete the circuit of the contacts at desired temperatures. This is done by rotating the bracket 4 that supports the fixed end of the ribbon on the screw bolt 5. The bracket 4 has a finger 28 that is bent so that it may extend through an arcuate slot 29. The finger 28 may be moved angularly about the axis of the bolt 5 which will angularly move the coiled ribbon and will consequently require the ribbon to move the capsule 6 a required degree before its axis passes through a horizontal plane. The position of the finger 28 will thus determine the temperature point at which the circuit will be closed. The finger 28 may be made in the form of a pointer or needle and its end may move over a scale 30 which will indicate the position at which the mercury switch will close the circuit of a source of current that may be connected to the terminals of the switch. The wires 10 are suitably connected to and supported on the more remote wall 3. This allows for the lateral flexure of the bimetal coil and maintains the connection notwithstanding any movement of the free end of the coil.

In Figure 1 is shown a conventional illustration of a system in which the thermostat may be installed. One of the wires 35 may be connected to any suitably translating device such as the motor 32 which may be used for operating any suitable mechanism in response to the thermic changes that cause the switch to open and close. The other wire 35 of the thermostat may be connected to a suitable controlling switch 33 which completes the circuit to the main lines 34 of a source of supply, such as, a battery, or a generator, or the main supply lines of any electrical circuit. If desired an indicator lamp, or relay, may be inserted in the circuit in place of the motor.

I claim:

In a thermostatic switch, a bimetal coiled strip, means for anchoring the strip at one end and a mercury switch supported entirely by the other end of the bimetal coil, an arm for angularly moving the coiled strip to adjust the operation of the switch to a predetermined temperature, a shell containing the coiled strip, the shell having dampered openings for adjusting the responsiveness of the switch.

In testimony whereof I have hereunto signed my name to this specification.

ESTEL C. RANEY.